United States Patent [19]

Houee et al.

[11] Patent Number: 4,631,654
[45] Date of Patent: Dec. 23, 1986

[54] TWO-STATE SWITCHED-MODE POWER SUPPLY

[75] Inventors: Yves L. P. Houee, Nanterre; Pierre Vacher, Suresnes, both of France

[73] Assignee: U.S. Philips Corporation, New York, N.Y.

[21] Appl. No.: 549,116

[22] Filed: Nov. 7, 1983

[30] Foreign Application Priority Data

Dec. 10, 1982 [FR] France ................ 82 20742

[51] Int. Cl.$^4$ ................................ H02M 3/335
[52] U.S. Cl. ................................ 363/21; 358/194.1; 363/67
[58] Field of Search .............. 363/21, 65, 67; 307/11, 307/20, 55; 358/190, 194.1

[56] References Cited

U.S. PATENT DOCUMENTS 4,024,577  5/1977  Diethelm ....................... 358/190

FOREIGN PATENT DOCUMENTS 3024721  1/1982  Fed. Rep. of Germany ........ 363/21
47706    6/1977  Japan ........................... 363/21
7810087  4/1980  Netherlands .................. 358/194.1

Primary Examiner—William H. Beha, Jr.
Attorney, Agent, or Firm—Thomas A. Briody; Jack Oisher; William J. Streeter

[57] ABSTRACT

A switched-mode power supply having at least two output terminals for supplying at least two different voltages and capable of operating in an alternate state in which some of the voltages are reduced. The power supply includes at least two controllable voltage sources coupled, respectively, to the output terminals and at least one voltage regulating circuit coupled to control inputs of the voltage sources for reducing the output voltages of both voltage sources proportionately when the voltage on the output of a first one of the voltage sources exceeds a preset reference level. The power supply further includes a circuit for selectively coupling a second one of the voltages sources to the regulating circuit. If the output of the second voltage source exceeds that of the first voltage source, when the second voltage source is coupled to the regulating circuit, the output voltages of all the voltage sources are reduced proportionately, while the voltages on the power supply output terminals are also reduced except for the output terminal coupled to the regulating circuit.

7 Claims, 6 Drawing Figures

TWO-STATE SWITCHED-MODE POWER SUPPLY

BACKGROUND OF THE INVENTION

The invention relates to a switched-mode power supply capable of operating optionally in two states, comprising at least two voltage sources and having at least two supply output terminals and comprising first means for supplying a signal which acts, on the switching operation, to reduce all the voltages supplied by the sources when one voltage exceeds a first reference value.

The invention also relates more specifically to a circuit capable of operating optionally in the following states:

either in a first state in which a first voltage source connected to a first output terminal applies thereto a first voltage, and at least a second voltage source connected to at least a second output terminal applies thereto a second voltage which is higher than the first voltage, or in a second state in which a voltage which is higher than or equal to the voltage applied to the first terminal in the first state is applied to it, while a voltage is applied to the second terminal which is less than the voltage applied to it in the first state.

The circuits of the type according to the invention are used particularly in television receivers having a remote control. They may be in two states corresponding to either normal operation of the television receiver or to the stand-by state, in which the receiving circuits of the remote control are normally fed, while the other circuits are supplied with a reduced voltage or are not fed at all.

In widely circuits, two separate supply sections are used, one for the remote control receiving circuit, the other one for the remaining portion of the television receiver. This system is expensive as it requires two separate power supplies.

In another widely used circuit, one single switched-mode power supply is used, and the voltages, other than those feeding the remote-controlled receiver, are cut-off, by means of change-over switches, during the stand-by state. It is then necessary to provide the possibility to cut-off, during operation, several high voltages and currents, which necessitates the use of a plurality of highly reliable and therefore expensive interruptors.

German Patent Specification No. DE 2,620,191 discloses a more satisfactory circuit, in which one of the windings of a switched-mode supply transformer is wound in a sense opposite to the winding sense of the other windings. Consequently, the voltages from this winding do not depend on the duty cycle. By varying the duty cycle, it is possible to reduce the other voltages without modifying the voltage from the said winding, which is used to feed the remote control receiving circuit. This system has, however, the disadvantage that the voltage from the inverse winding is not stabilized by the overall stabilizing system and that it is then necessary to provide an additional series-arranged stabilizing circuit for the usual case in which the line voltage may vary considerably, and especially with the now prevailing tendency according to which the television sets may be connected without change-over to all the 90 v. to 250 v. lines voltages. This stabilizing circuit, apart from its price, has the disadvantage that it increases the power consumption in the stand-by state.

SUMMARY OF THE INVENTION

The circuit according to the invention has for its object to provide a power supply which does not have any of the above-mentioned disadvantages.

The circuit according to the invention is therefore characterized in that all the voltages from the sources are modified simultaneously in the same proportion, and, at the same time, at least one connection between an output terminal and a source is replaced by a connection between this output terminal and another source.

In an advantageous variation, two of these voltage sources are interconnected, while all the voltages from these sources are modified simultaneously in the same proportion.

A circuit according to the invention is characterized in that second means are furthermore provided for supplying a signal which acts on the switching operation to reduce together the values of the voltage supplied when a voltage exceeds a second reference value, and in that it also comprises:

first change-over elements for connecting one of the voltage sources optionally either to the first or to the second means, second change-over elements for connecting an output terminal either to the one or the other voltage source, and a device which simultaneously controls the first and second change-over elements for selecting the desired state.

In an advantageous variation, a circuit according to the invention is characterized in that the first means are connected to the first terminal and the circuit comprises change-over elements for adjusting the circuit to the second state by optionally connecting the first terminal to the second voltage source.

An advantageous embodiment of the invention is characterized in that a current limiter is arranged in series with the change-over elements, or the change-over elements comprise a controllable current limiter.

The advantage of the invention resides in the fact that it makes it possible to reduce all the voltages, except one, by means of one single interrupter through which no high currents flow, all the voltages remaining permanently stabilized by the single stabilizing circuit.

DESCRIPTION OF THE DRAWINGS

The following description which is given by way of non-limitative example with reference to the accompanying drawings will make it better understood how the invention can be put into effect.

The FIGS. 1 to 5 show schematically different embodiments of the invention.

DESCRIPTION OF THE PREFERRED EMBODIMENTS

Figure 1:
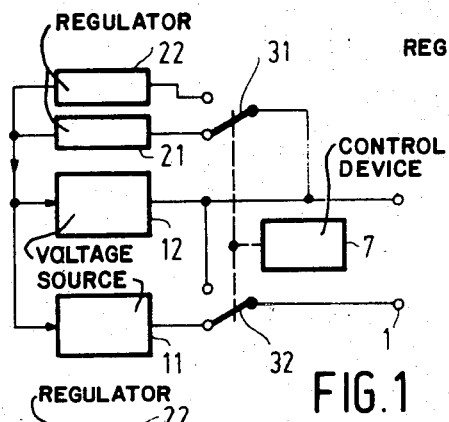

The circuit according to the invention can be put in effect as shown in FIG. 1. By means of the circuit it is possible to modify simultaneously several voltages supplied at terminals of a switched mode power supply comprising several voltage sources, these voltages being optionally modified into one sense or in different ratios according to the terminals under consideration. To obtain this effect, the voltages from the sources are all modified at the same time proportionately by means of a change-over element which optionally selects a regulating circuit and, simultaneously, at least one connection between a terminal and a source is replaced by a connection between that terminal and another source by means of a further change-over element. Thus, the voltage at one of the terminals is modified in a ratio which depends on the regulating circuits, while the voltage at another terminal is modified with a different ratio, and possibly even in a different sense, as the source feeding it has changed.

The switched mode power supply of FIG. 1 is arranged such that it can optionally function in two states. It comprises the two voltage sources 11, 12 to supply output terminals 1,2, respectively, and first regulating means 21 to supply a signal which acts to reduce all the voltages supplied by the sources, when one of the voltages exceeds a first reference value. Second regulating means 22 are, inter alia, provided to supply a signal which acts to reduce all the values of the voltages supplied when one of the voltages exceeds a second reference value, and there are also provided:

first change-over elements 31 for connecting the output of one of the voltage sources 12 optionally either to the first means 21 or to the second means 22, second change-over elements 32 to connect the output terminal 1 to the output of either one voltage source (11) or the other voltage source (12), and a device 7 which simultaneously controls the first and second change-over elements, to select the desired state.

Figure 2:
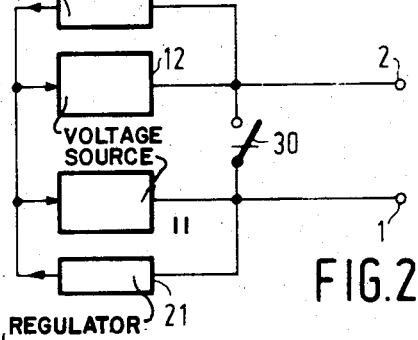

An advantageous variation of the invention may be put into effect with the circuit shown in FIG. 2. In this variation the regulating circuit 21 is connected to the source 11. The source 12 supplies a higher voltage than the source 11. Thus, when the interrupter 30, which operates as the change-over element, is closed, the regulating means 21 is connected to the output of source 12, and as a result thereof source 12 assumes the voltage which the source 11 had until then, and the voltage of the source 11 is lowered proportionally with the voltage of source 12, but it does no longer supply power as the voltage it can supply is less than the voltage present at its output. As is customary, the power supply 11 may comprise at least one diode (24, FIG. 6), which prevents a current from entering into the voltage source if the voltage at its terminals is higher than the voltage it can supply. The voltages supplied by the sources are therefore modified all at the same time while refraining the same voltage ratio by connecting, via the change-over switch 30, the regulating means 21 to the source 12 which, because of its higher output voltage than source 11, is then controlled by regulating means 21, and by simultaneously interconnecting the two voltage sources 11 and 12 by means of the same change-over element 30.

The switched-mode power supply circuit shown in FIG. 2 can then optionally operate in two states:

either in a first state in which the first voltage source 11, connected to a first output terminal 1, applies a first voltage to that terminal and the second source 12, connected to a second output terminal 2, applies a second voltage which is higher than the first voltage to that terminal, or in a second state in which there is applied to the first terminal 1 a voltage which is higher than or equal to the voltage applied thereto in the first state, while to the second terminal 2 a voltage is applied which is lower than the voltage applied to it in the first state.

The first regulating means 21 produces a signal when a supplied voltage exceeds a reference value, this signal acting, on the switched-mode, to reduce together all the values of the supplied voltages. The first regulating means 21 is connected to the terminal 1 and the circuit comprises change-over elements 30 for adjusting the circuit to the second state by optionally connecting the terminal 1 to the second voltage source 12.

Let it be assumed, for example, that the voltage sources 11 and 12 are designed such thaet the source 12 supplies a voltage which has three times the value of the voltage supplied by 11 and that the first regulating means 21 limits the supplied voltages when the voltage supplied by source 11 exceeds the 5 Volts reference value. At that moment, the source 12 supplies 15 Volts. When the interruptor 30 is closed, the first regulating means 21 is then connected to the source 12 limiting the voltage from that source 12 to 5 Volts. The source 11 can only supply one third of 5 Volts and therefore no longer supplies power. The two interconnected terminals 1 and 2 are now supplied at 5 Volts. The voltage terminal 2 receives a voltage (5 Volts) which is less than the voltage (15 Volts) it received in the first state, while a voltage of 5 Volts is supplied to the terminal 1 and is equal to the voltage it received in the first state.

It is alternatively possible to provide a second regulating means 22 permanently connected to the second voltage source for supplying a limiting signal when a supplied voltage exceeds a second reference value. Let it be assumed that in the above example the second regulating means 22 acts for a voltage of 12 Volts. In the first state, the source 12 can then supply no more than 12 Volts to the terminal 2 and the source 11 applies one-third thereof, i.e. 4 Volts to the terminal 1. In the second state, the first regulating means 21 limits the voltage from the source 12 to 5 Volts. The terminal 2 then receives a voltage (5 Volts) which is less than the voltage it received in the first state (12 Volts), while terminal 1 receives a voltage (5 Volts) which is higher than the 4 Volts it received in the first state.

Figure 3:
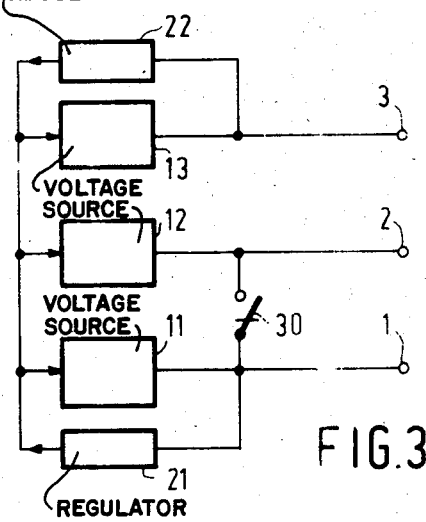

As shown in FIG. 3, it is alternatively possible to provide several second sources 12, 13 connected to several second terminals 2,3 to which they apply voltages of which at least one (12), which will be denoted the high voltage, is higher than the first voltage from the first source 11. The change-over element 30 connects, if so desired, the output of terminal 1 to the source 12. The voltages supplied by the source 12 are, for example, 6 times higher, and the voltages supplied by the source 13 three times higher, than the voltages supplied by the source 11. The first regulating means 21 connected to the terminal 1 limits the voltages when a supplied voltage exceeds the 5 Volts reference value and the second regulating means 22 connected to the terminal 3 limits the voltages when a supplied voltage exceeds the 14 Volts reference value. When interruptor 30 is open, there is present, thanks to the action of the second regulating means 22, a voltage of 14 Volts at the terminal 3 and voltages of 4.66 and 28 Volts, respectively, i.e. with the correct ratios, are present at the terminals 1 and 2. The first regulating means 21 is not operative since the voltage at the terminal 1 is less than 5 Volts. When the interruptor 30 is closed, the first regulating means 21 becomes operative and limits the voltage at the interconnected terminals 1 and 2 to 5 Volts. Thus, the source 11 is now regulated to supply 0.8 Volts and does not supply power and the source 13 is now regulated to supply 2.5 Volts. The second regulating means 22 is no longer operative. Circuits (not shown) fed by the terminals 2 and 3 have their voltage considerably reduced by a ratio of 5.6:1 in the above example while the power supplied to the stand-by circuits, which are fed from the terminal 1, is not modified or is somewhat increased.

If the second regulating means 22 is omitted, for example in the circuit shown in FIG. 2, the respective voltages at the terminals 1,2,3 become, for the first state, 5; 30; 15 Volts, and, for the second state, 5; 5; 2.5 Volts. In the second state, there is no change at all. The second regulating means 22 has for its object to ascertain that, in the first state, the voltge at the terminal to which it is connected is regulated with the highest degree of precision when the circuits it feeds particularly require a voltage which is more stable than the other voltages. With a circuit of the type shown in FIG. 2, it is possible that the voltage ratio btween the very stable voltage terminal regulated by the second regulating means 22 and the terminal 1, which is, for example, connected to the remote control receiving circuit, does not permit a sufficient reduction of the voltage when the method according to the invention is put into effect and the second regulating means 22 is then preferably connected to a terminal 3 different from the terminal (2) to which the first terminal 1 is connected in the second state, as realized in the circuit shown in FIG. 3.

Figure 4:
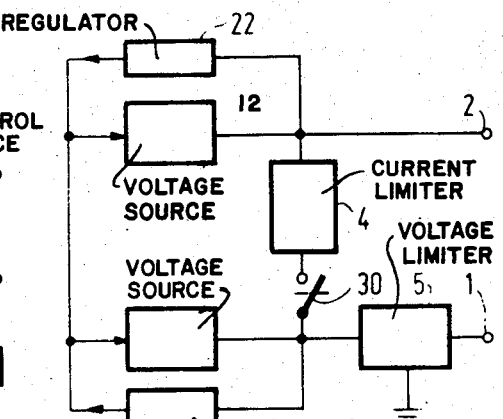
Figure 5:
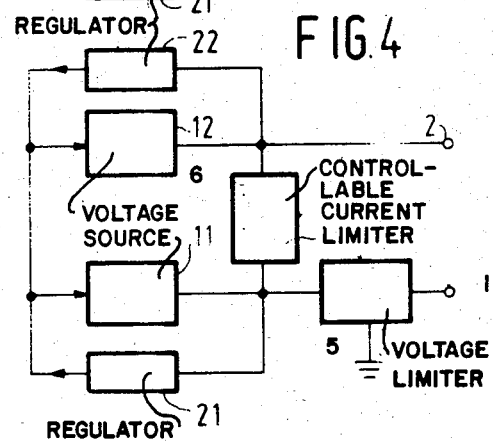

When the terminal 1 is connected to the voltage source 12, there is a risk that, before the change in the regulation has been able to become effective, the terminal 1 is brought, for a very short period of time, to a voltage which is harmful to the circuits it supplies. This is particularly the result from the charge accumulated in a capacitor (25, FIG. 6) present in the voltage source 12. In order to prevent damage, it is therefore advantageous to provide a current limitation, and possibly a voltage limitation for the terminal 1. FIG. 4 shows how for that purpose a current limiter 4 is arranged between the voltage source 12 and the terminal 1, in series with the change-over element 30. FIG. 5 shows an advantageous arrangement in which the assembly of change-over means 30 and the limiter 4 is combined in a controllable current limiter 6, which thus forms the change-over means.

In FIGS. 4 and 5 reference numeral 5 denotes a voltage limiting circuit via which the connection of the terminal 1 to the change-over elements 6 or 30 and to the voltage source 11 is ensured. This circuit 5 does not form a voltage stabilizer but has only for its purpose to limit the voltage at the terminal 1 to a value which is compatible with the safety of the circuits.

Figure 6:
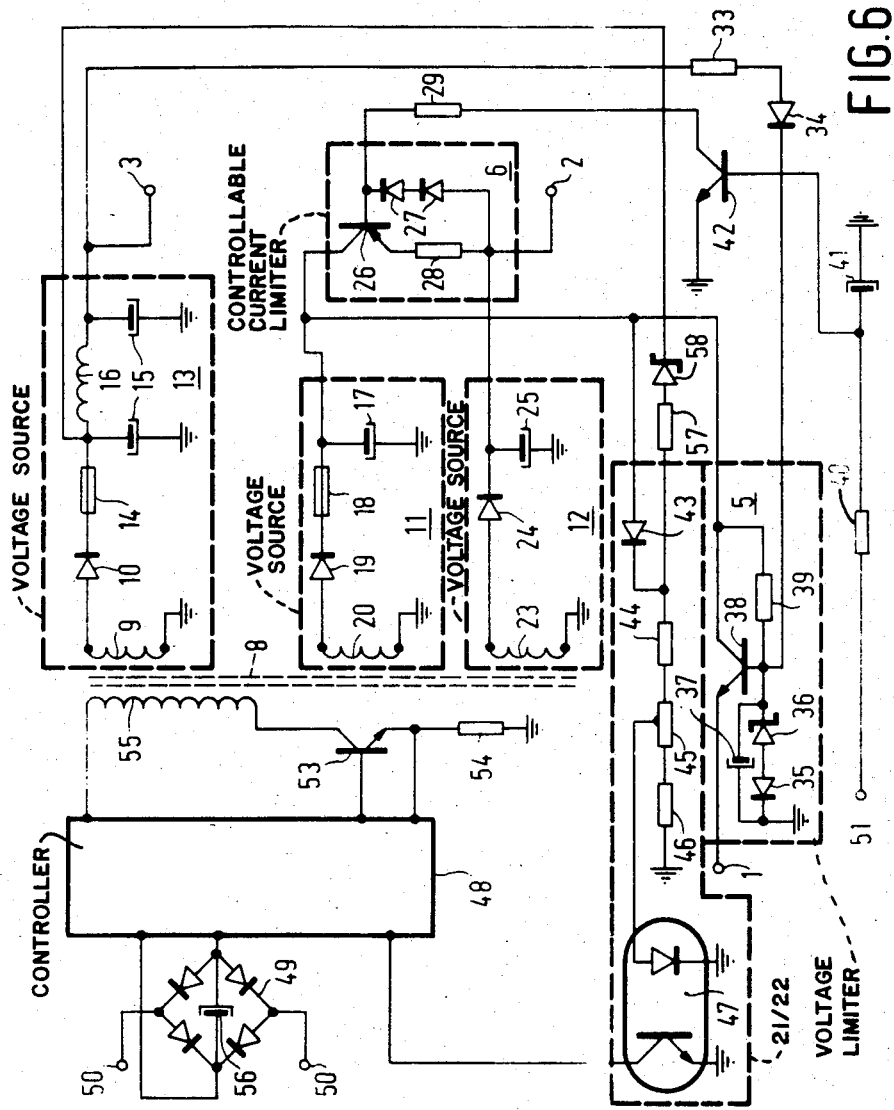
FIG. 6 shows a detailed circuit diagram of a preferred embodiment.

FIG. 6 shows in greater detail a preferred embodiment of the invention which substantially corresponds to the circuit shown in FIG. 3 comprising inter alia the circuits 5 and 6 of FIG. 52.

The circuits 11, 12, 13, 21, 5, 6 of the preceding Figures are indicated by means of broken-line boxes. The first and second regulating means 21 and 22 use a portion (44 to 47) in common to act on the switching and to reduce the values of the supply voltages.

The line voltage is applied to terminals 50 where it is rectified by bridge-connected diodes 49 and smoothed by a capacitor 56. The voltage obtained across capacitor 56 is applied to a known circuit 48, which controls the switching operation. This circuit 48, which comprises, for example, an integrated circuit TEA 1039 marketed by RTC LA RADIOTECHNIQUE-COMPELEC and intended to control and regulate switched-mode power supplies, applies its base control voltage to a switching transistor 53 and receives in return information about the current of the transistor 53, measured by an emitter resistor 54. The primary winding 55 of a supply transformer 8 is included in the collector lead of the transistor 53. The circuit 48 also receives a signal from a photo-coupler 47, which signal acts on the switching action to reduce the total of the values of the voltages applied to secondary windings 9, 20, 23 of the transformer 8. This signal acts in known manner, by changing the duty cycle of the control pulses applied to the base of transistor 53. The photocoupler 47 provides for d.c. isolation between line voltage and the circuits of the television receiver. The second regulating means 22 is formed by the photocoupler 47 connected to a tap of a chain of resistors 57, 44, 45, 46, one end of which is connected to ground and the other end to the anode of a zener diode 58, whose cathode is connected to the voltage source 13. The location of the tap is chosen such that the voltage from the source 13 is adjusted to 14 Volts.

The first regulating means 21 is provided by the same components 44 to 47 and a diode 43, whose cathode is connected to the junction of the resistors 44 and 57, and whose anode is connected to the voltage source 11. The resistance values are chosen such that, when the second regulating means 22 acts with respect to a 14 Volts reference voltage, the first regulating means 21 is operative for a voltage of the order of 5.5 Volts. The three positive voltage sources 11, 12 and 13 are formed by windings 20, 23 and 9, respectively, of the transformer 8, which supply rectifying diodes 19, 24 and 10, respectively and smoothing capacitors 17, 25 and 15, respectively. Fuses 14 and 18 may be provided in series with diodes 10 and 19, respectively. The source 13 comprises furthermore an inductance 16 arranged between two capacitors 15. These three voltage sources are well-known to a person skilled in the art. The three windings 20, 23 and 9 are wound in the same sense with respect to their end connected to ground in such a way as to supply an inductive current during the periods of time the transistor 53 is nonconductive. The ratios between the number of turns of the windings 9, 20 and 30 are such that the voltage source 11 supplies approximately 5 Volts when the voltage source 13 supplies 14 Volts (thanks to the action of the second regulating means 22) and the source 12 supplies approximately 30 Volts. Each terminal 1, 2, 3 is connected to one of the voltage sources 11, 12, 13, respectively.

The sources 11 and 12 are optionally interconnected by the circuit 6. This circuit 6 comprises a pnp transistor 26 whose collector is connected to the source 11 and whose emitter is connected via a resistor 28 to the source 12 and to the terminal 2. Two diodes 27 are arranged in series between the terminal 2 and the base of the transistor 26. They are conductive when the terminal 2 is positive relative to the base of the transistor 26. They have for their object to limit in known manner the current through the resistor 28 to a value such that the voltage at the terminals of this resistor is substantially equal to the direct voltage drop across the terminals of a diode. Thus, the circuit 6 forms a current limiter. The transistor 26 is, on the other hand, optionally rendered conductive when an adequate signal is applied to a terminal 51. Such a signal is positive and is applied via a network RC 40, 41 to the base of an NPN transistor 42, whose emitter is connected to ground. This transistor 42 becomes conductive and controls, via a resistor 29 which is arranged between its collector and the base of collector 26, the conduction of the transistor 26. This circuit RC 40, 41 has for its object to provide a slight time delay in rendering the circuit 6 conductive. Thus, the circuit 6 is a limited current interruptor which is controllable by a signal applied to the terminal 51.

A voltage limiting circuit 5 is arranged between the terminal 1 and the voltage source 11. This voltage limiter is formed by an NPN transistor 38, whose emitter is connected to the terminal 1 and the collector to the voltage source 11. The base of this transistor 38 is connected to ground via two diodes 35, 36 arranged oppositely and in series, the cathode of the diode 36, which is a Zener diode facing the base. The current for this Zener diode 36 is supplied by a resistor 39 which connects the cathode of the diode 36 to the voltage source 11 and also by a diode 34 which is in series with resistor 33 which connects the cathode of the Zener diode 36 to the voltage source 13. A large-capacitance capacitor 37 arranged in parallel with the diodes 35, 36 makes it possible to provide a lower dynamic impedance.

When a positive signal is applied to the terminal 51, the transistor 26 becomes conductive and the voltage source 12 supplies a current towards the terminal 1, but the current is however limited by the resistor 28. It is, however, sufficient to render the diode 43 conductive, which produces a signal transmitted by the photocoupler 47, which reduces the supplied voltages until the voltage from the source 12 has decreased to approximately 5.5 Volts instead of the 30 Volts it had previously. At this moment the voltages from the source 11 and 13 are reduced in the same ratio. The source 11 can no longer supply current as the capacitor 17 remains charged to 5.5 Volts by the connection to the source 12, which blocks the diode 19 and the voltage source 13 supplies approximately 2.6 Volts. The apparatus connected to the terminals 2 and 3 which had received 30 and 14 Volts, respectively, are now in the stand-by condition and are fed with 5.6 and 2.6 Volts, respectively, while the remote control circuits connected to the terminal 1 are always supplied at their nominal voltage of 5.5 to 5.6 Volts.

An embodiment of the circuit shown in FIG. 6 has given satifactory results with the following values:

Resistors
28: 1Ω
29: 1 kΩ
33: 1.2 kΩ
39: 180Ω
40: 10 kΩ
44: 560Ω
45 pot: 100Ω
46: 100Ω
54: 0.12Ω
57: 120Ω

Capacitors
15: 1500 μF
17: 4700 μF
25: 680 μF
37: 1000 μF
41: 6.8 μF
56: 150 μF

Semiconductors
10: BYV 95 A
19: BYW 95 A
24: BYW 95 A
26: BD 234
27: 1 N 4148
34: 1 N 4148
35: 1 N 4148
36: BZX 79 B 5V 6
38: BD 433
42: BC 549
43: 1 N 4148
47: CNX 62
49: 4 X BYW 55
53: BU 826
58: BZX 70 B 6V8

What is claimed is:

1. A switched-mode power supply capable of operating optionally in two states, comprising at least two controllable voltage sources having respective control inputs, at least two power supply output terminals and first regulating means coupled to the control input on each of said voltage sources for supplying a signal which acts, on the switching operation, to reduce the values of the voltages supplied by all of the voltage sources when one voltage exceeds a first reference value, characterized in that said switched-mode power supply further comprises second regulating means also coupled to said control inputs for supplying a signal which acts, on the switching operation, to reduce the values of the voltages supplied by all the voltage sources when a voltage exceeds a second reference voltage, first change-over elements for selectively connecting an output of one of the voltage sources to the first regulating means in a first state or to the second regulating means in a second state, second change-over elements for selectively connecting one of said output terminals to one voltage source in the first state or to the other voltage source in the second state, and a device which simultaneously controls the first and second change-over elements for selecting the desired state.

2. A switched-mode power supply capable of operating optionally in two states, said power supply comprising a first voltage source having an output for supplying a first voltage and a control input, a second voltage source having an output for supplying a second voltage and a control input, said second voltage being higher than said first voltage, first and second output terminals coupled, respectively, to the outputs of said first and second voltage sources, and regulating means coupled to the control input of each of said voltage sources for supplying thereto a control signal when a voltage applied to said regulating means exceeds a reference level, characterized in that said regulating means is coupled to said first output terminal and said power supply further comprises a change-over element for selectively coupling said first output terminal to the output of said second voltage source, whereby, in a first of said two states, the outputs of said first and second voltage sources are connected, respectively, to said first and second output terminals, said regulating means generating said control signal based on the output of said first voltage source, and, in a second of said two states, the output of said second voltage source is connected to both said first and second output terminals, said regulating means generating said control signal based on the output of said second voltage source, said control signal thereby causing said first and second voltage sources to reduce said first and second voltages proportionately.

3. A switched-mode power supply as claimed in claim 2, characterized in that said power supply further comprises additional voltage sources connected to additional output terminals, said additional voltage sources having control inputs coupled to receive said control signal, whereby in said second state, voltages at the outputs of said additional voltage sources are reduced proportionately with said first and second voltages.

4. A switched-mode power supply as claimed in claim 3, characterized in that said power supply further comprises further regulating means coupled to at least the control input of one of said additional voltage sources for supplying a control signal when the voltage at the output of said additional voltage source applied thereto exceeds a further reference level, said further reference level being higher than said reference level.

5. A switched-mode power supply as claimed in claim 2, characterized in that said power supply further comprises further regulating means coupled to the control input of said second voltage source for supplying a control signal when said second voltage applied thereto exceed a further reference level, said further reference level being higher than said reference level.

6. A switched-mode power supply as claimed in claim 2 or 5, characterized in that said power supply further comprises a current limiter arranged in series with said change-over element.

7. A switched-mode power supply as claimed in claim 2 or 5, characterized in that said power supply further comprises a voltage-limiting circuit coupled between said change-over element and said first terminal.

* * * * *